(12) United States Patent
Wiss et al.

(10) Patent No.: US 8,175,186 B1
(45) Date of Patent: May 8, 2012

(54) PRESERVING THE CONTENT OF A COMMUNICATION SIGNAL CORRUPTED BY INTERFERENCE DURING TRANSMISSION

(75) Inventors: John Robert Wiss, Carlsbad, CA (US); Yuhui Marie Ren, San Diego, CA (US)

(73) Assignee: L-3 Services, Inc., San Diego, CA (US)

( * ) Notice: Subject to any disclaimer, the term of this patent is extended or adjusted under 35 U.S.C. 154(b) by 839 days.

(21) Appl. No.: 12/274,636

(22) Filed: Nov. 20, 2008

(51) Int. Cl.
*H04L 27/00* (2006.01)

(52) U.S. Cl. ....................................................... 375/295

(58) Field of Classification Search .................. 375/295, 375/267, 299, 296, 347
See application file for complete search history.

(56) References Cited

U.S. PATENT DOCUMENTS

| | | | | |
|---|---|---|---|---|
| 5,446,747 | A * | 8/1995 | Berrou .......................... | 714/788 |
| 2002/0108087 | A1 * | 8/2002 | Liu et al. ....................... | 714/765 |
| 2003/0072283 | A1 * | 4/2003 | Varshney et al. .............. | 370/335 |
| 2004/0085919 | A1 * | 5/2004 | Song et al. .................... | 370/320 |
| 2004/0252700 | A1 * | 12/2004 | Anandakumar et al. . | 370/395.21 |
| 2005/0052991 | A1 * | 3/2005 | Kadous .......................... | 370/216 |
| 2005/0159115 | A1 * | 7/2005 | Sandhu .......................... | 455/101 |
| 2005/0243774 | A1 * | 11/2005 | Choi et al. ..................... | 370/335 |
| 2006/0159195 | A1 * | 7/2006 | Ionescu et al. ................ | 375/267 |
| 2006/0211377 | A1 * | 9/2006 | Shoemake et al. .......... | 455/67.13 |
| 2007/0171819 | A1 * | 7/2007 | Julian et al. ................... | 370/229 |
| 2009/0239494 | A1 * | 9/2009 | Park et al. ................... | 455/278.1 |

* cited by examiner

*Primary Examiner* — Juan A Torres
(74) *Attorney, Agent, or Firm* — Edward W. Callan

(57) ABSTRACT

A communication signal including a plurality of bursts that individually include a plurality of data symbols is processed by both interleaving diversity and duplication diversity prior to transmission in order to preserve the content of the signal when the signal is corrupted by interference during transmission of the signal. A received communication signal having a plurality of bursts that individually include a plurality of data symbols which have been processed for transmission by interleaving diversity is processed to recover the content of the signal when the signal is corrupted by interference during transmission of the signal. Upon determining that the received communication signal may have been corrupted by interference during transmission, the received signal is processed by inserting erasure symbols into a deinterleaver prior to deinterleaving of the data symbols. The erasure symbols are necessary for recovering the content of the transmitted interleaved data symbols.

17 Claims, 5 Drawing Sheets

PRESERVING THE CONTENT OF A COMMUNICATION SIGNAL CORRUPTED BY INTERFERENCE DURING TRANSMISSION

BACKGROUND AND SUMMARY OF THE INVENTION

The present invention pertains to preserving the content of a communication signal corrupted by interference during transmission. Such interference may be caused by intentional jamming or by scintillation from a nuclear source, among other things.

The present invention selectively utilizes interleaver diversity and/or duplication diversity to preserve the content of a communication signal having a plurality of bursts that individually include a plurality of data symbols.

Interleaver diversity is a technique of scheduling transmission of data symbols such that data symbols of different bursts are interleaved with data symbols from other bursts so that the data symbols will be interleaved amongst multiple bursts, whereby the destruction of one or several bursts will appear as random errors to a receiver after deinterleaving and can be received without error following decoding when there is adequate interleaver depth, and acceptable levels of jamming and/or scintillation and duty factor (% of bursts jammed per bursts sent).

Duplication diversity is a technique of transmitting multiple copies of the information contained in a data burst simultaneously by using multiple transmitters and/or repeatedly transmitting the data burst in order to dramatically improve the probability of successful reception of the data symbols within the burst.

The present invention provides a system for processing a communication signal having a plurality of bursts that individually include a plurality of data symbols in order to preserve the content of the signal when the signal is corrupted by interference during transmission of the signal, comprising: means for interleaving data symbols of different individual bursts of said communication signal; means for causing multiple transmissions of the content of said communication signal; and means for controlling operation of the interleaving means and the means for causing multiple transmissions in accordance with data indicating (i) the time sensitivity of the data to be transmitted in the communication signal and (ii) the degree of vulnerability of the communication signal to interference during transmission of said signal.

The present invention also provides a method of processing a communication signal having a plurality of bursts that individually include a plurality of data symbols in order to preserve the content of the signal when the signal is corrupted by interference during transmission of the signal, comprising the steps of:

(a) processing data indicating (i) the time sensitivity of the data to be transmitted in the communication signal, and, (ii) the degree of vulnerability of the communication signal to interference during transmission of said signal; and (b) in accordance with said indications, effecting either the step of:

(c) interleaving data symbols of different individual bursts of said communication signal; or the step of:

(d) causing multiple transmissions of the content of said communication signal; or both steps (c) and (d).

The present invention additionally provides computer readable storage media, including computer executable program instructions for causing one or more computers to perform and/or enable one or more functions of the respective systems. Additional features of the present invention are described with reference to the detailed description.

DETAILED DESCRIPTION

Figure 1:
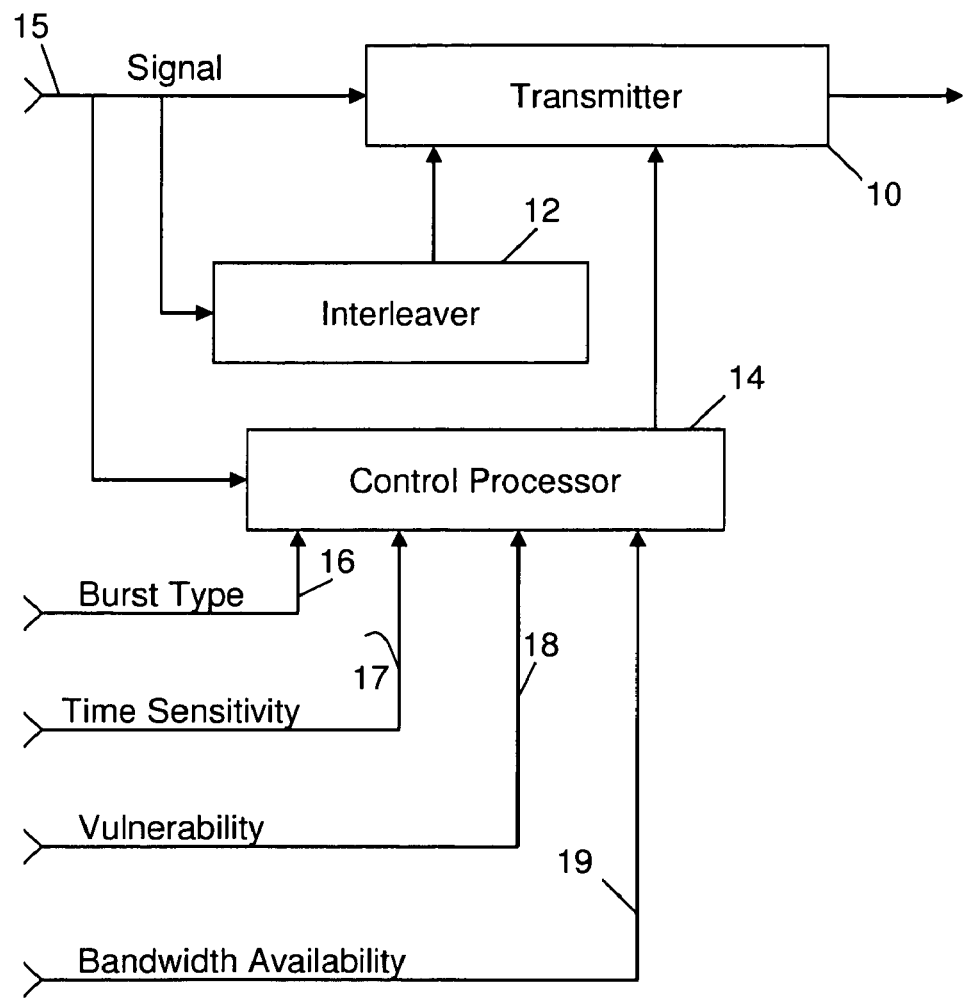
FIG. 1 is a block diagram of a system for processing a signal to enhance the preservation of the content of a communication signal during transmission.

An exemplary embodiment of a system for processing a communication signal having a plurality of bursts that individually include a plurality of data symbols, in order to preserve the content of the signal when the signal is corrupted by interference during transmission of the signal is shown in FIG. 1. The system of FIG. 1 includes a transmitter 10, an interleaver 12 and a diversity control processor 14.

Figure 2:
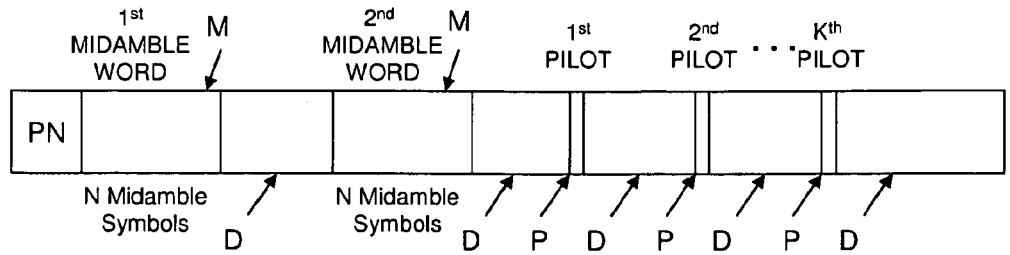
FIG. 2 is a diagram of the structure of a data burst of a communication signal processed by the system of the present invention to enhance preservation of the content of the data burst.

A communication signal 15 that is to be transmitted is provided to the transmitter 10 and the interleaver 12. A preferred embodiment of the structure of a data burst of a communication signal that is provided for diversity processing by the system of the present invention is shown in FIG. 2. Each burst includes a sacrificial pseudo noise segment (PN), a plurality of midamble words (M), a plurality of data segments (D) and a plurality of pilot symbols (P). The plurality of midamble words respectively contain different segments of the preamble of the burst. Each midamble word includes a predetermined number "n" of symbols. The midamble segments are separated by one or more data segments. Each data segment includes a known number of data symbols. There is a group of a predetermined number "k" of pilot signals after the last midamble segment of the burst. The pilot symbols are separated by the data segments.

This structure of the data bursts allows robust detection and estimation of the bursts in the communications signal. The burst structure is utilized to perform scheduled packet detection, frequency estimation and correction, phase estimation and correction, gain leveling, and symbol time estimation and correction. The pilot symbols are inserted periodically with pseudorandom noise cover to allow for robust frequency tracking and phase correction throughout the burst. The midambles and the pilot symbols enable the bursts to be demodulated through completely coherent techniques. The data symbols are not used for any of the above described functions, since a correlation gain is not possible by processing the random data by itself.

The data burst structure is protected during transmission by an encrypted transmission security code, which controls the time and frequency placement of certain key messages in the communication signal 15, as well as distributing the transmission bursts in a format that is unpredictable to an adversary with the same modem hardware as used for transmission, but lacking the encrypted transmission security code. The pilot symbols and midambles are also covered by the encrypted transmission security code so that they can be changed in number and density and somewhat in location to thereby make their positions more difficult to locate, depending upon the threat level of jamming and/or scintillation. The sacrificial PN segment is a random sequence of Binary Phase Shift Keying (BPSK) symbols that may be of varying length. The inclusion of a sacrificial PN segment allows a channel of interest to be leveled by gain control to a desired level at the analog-to-digital converters of the demodulator.

Figure 3:
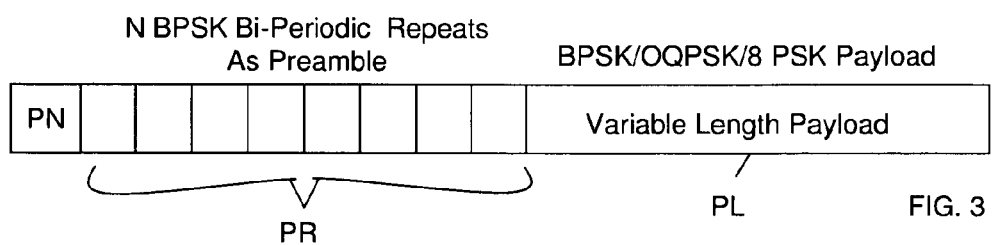
FIG. 3 is a diagram of the structure of a forward order wire (FOW) burst of a communication signal processed by the system of the present invention to enhance preservation of the content of the FOW burst.

A preferred embodiment of the structure of a forward order wire (FOW) burst of a communication signal that is provided for diversity processing by the system of the present invention is shown in FIG. 3. Each burst includes a sacrificial pseudo noise segment (PN), a preamble (PR) and a payload (PL). The preamble includes a predetermined number "m" of repeats of preamble data. The payload including the FOW data is of variable length. In an alternative embodiment, pilot symbols are inserted to aid in tracking robustness.

The interleaver 12 is adapted for diversity processing of a burst of the communication signal by interleaving data symbols of different individual data bursts of the communication signal 15. The bursts of interleaved data symbols are generated pursuant to a block code, such as a Turbo code (TC), for facilitating forward error correction (FEC).

The transmitter 10 is adapted for diversity processing of a burst of the communication signal by causing multiple transmissions of the content of the communication signal 15, including both data bursts and FOW bursts. In alternative embodiments, the transmitter 10 is adapted for transmitting the communication signal 15 in a plurality of different time and/or frequency slots in order to make the transmission redundant. The transmitter 10 is also adapted for transmitting a burst of the communication signal 15 without any diversity processing when the channel conditions so allow.

In one preferred embodiment the transmitter 10 is part of a transceiver in a modem having a scalable architecture that allows up to four simultaneous transmit channels and up to four simultaneous receive channels. In other embodiments, different numbers of plural simultaneous transmit and receive channels are provided. The transmitter 10 has agile tuning, in the sense that the signal carriers can be tuned over a 500 MHz or greater bandwidth and still meet a switching time specification of 31.25 sec. Accordingly each transmitter or receiver channel is able to process a burst and be re-tuned and settled to within 100 kHz in 31.25 sec. while preparing for modulating or demodulating another burst. Bursts are repeated for duplication diversity to dramatically improve the probability of successful reception of the data. The repeated bursts may be covered by respectively different encrypted transmission security codes.

The diversity control processor 14 processes data indicating the type of burst 16, the time sensitivity 17 and the vulnerability 18 of the communication signal 15 together with data indicating the bandwidth available 19 for transmission to determine whether the signal 15 is to be processed in accordance with interleaver diversity (ID) and/or duplication diversity (DD), or without either interleaver diversity or duplication diversity.

The diversity control processor 14 includes a computer. A computer readable medium, which is provided for use with the computer, contains computer executable program instructions for causing the computer to process the time-sensitivity data 17, the degree-of-vulnerability data 18 and the available-bandwidth data 19 to control the operation of the interleaver 12 and the transmitter 10. The type-of-burst data 16 and the time-sensitivity data 17 are derived from the communication signal 15 that is to be transmitted.

Figure 4:
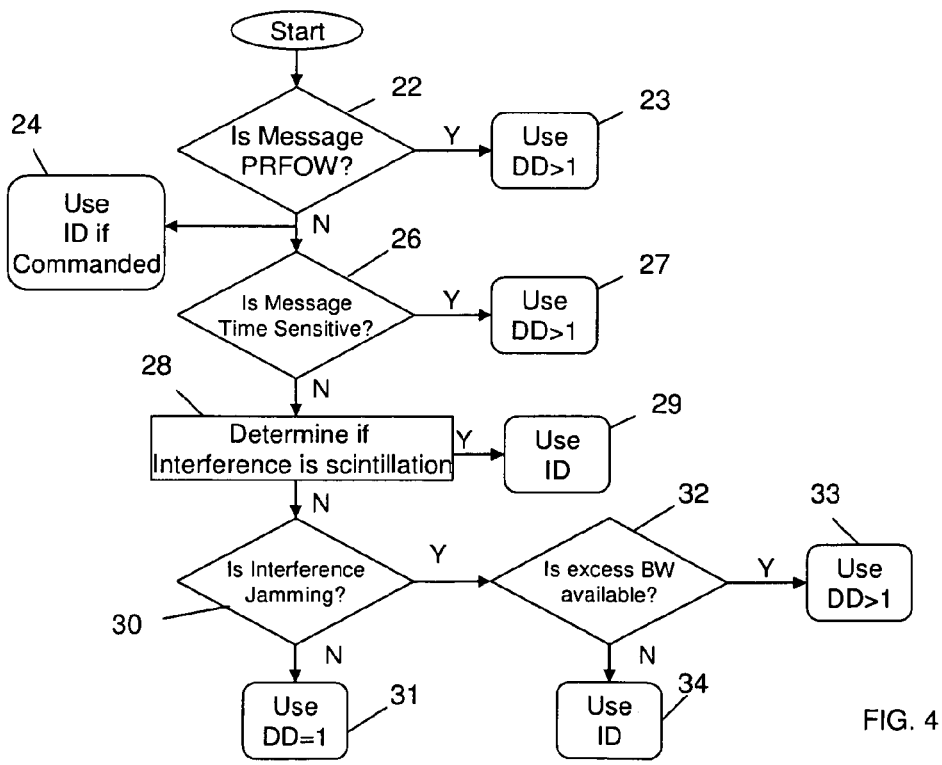
FIG. 4 is a decision diagram for the control processor included in the system of FIG. 1.

A decision diagram for the diversity control processor is shown in FIG. 4. The control processor 14 first processes the burst-type data 16 to determine whether or not the burst is a FOW burst, as shown at 22. If the control processor determines that the burst is a FOW burst (as indicated by "Y"), the control processor 14 causes the burst to be processed by duplication diversity (DD>1), as shown at 23. If the control processor 14 determines that the burst is not a FOW burst (as indicated by "N"), the control processor 14 either causes or does not cause the burst to be processed by interleaver diversity (ID), as shown at 24, in accordance with which alternative is specified by the program instructions.

If the control processor 14 determines that the burst is not a FOW burst (as indicated by "N"), the control processor 14 next processes the time-sensitivity data 17 to determine whether or not the communication signal 15 containing the data burst is time sensitive, as shown at 26. The signal is time sensitive if it should be transmitted without delay. In some preferred embodiments, voice data signals are time sensitive. If the control processor determines that the communication signal 15 containing the data burst is time sensitive, the control processor 14 causes the burst to be processed by duplication diversity (DD>1), as shown at 27.

If the control processor 14 determines that the communication signal 15 containing the data burst is not time-sensitive, the control processor 14 next processes the vulnerability data 18 to determine whether or not the communication signal is vulnerable to interference caused by nuclear scintillation, as shown 28. If the control processor 14 determines that the burst is vulnerable to interference caused by nuclear scintillation, the control processor 14 causes the burst to be processed by interleaver diversity (ID), as shown at 29.

If the control processor 14 determines that the burst is not vulnerable to interference caused by nuclear scintillation, the control processor 14 processes the vulnerability data 18 to determine whether or not the communication signal is vulnerable to interference caused by jamming, as shown 30. If the control processor 14 determines that the burst is not vulnerable to interference caused by jamming, the control processor 14 causes the burst to be processed without duplication diversity (DD=1), as shown at 31.

If the control processor 14 determines that the burst is vulnerable to interference caused by jamming, the control processor 14 next processes the bandwidth-availability data 19 to determine whether or not there is adequate bandwidth available for duplication diversity processing of the communication signal 15, as shown at 32. If the control processor 14 determines that there is adequate bandwidth available for duplication diversity processing of the communication signal 15, the control processor causes the burst to be processed by duplication diversity (DD>1), as shown at 33.

If the control processor 14 determines that there is not adequate bandwidth available for duplication diversity processing of the communication signal 15, the control processor causes the burst to be processed by interleaver diversity (ID), as shown at 34.

Interleaving diversity sacrifices delay for bandwidth efficiency. Duplication diversity is less disadvantageous from the viewpoint of bandwidth efficiency when the message is relatively short.

Anti-jamming protection is enhanced when time interleaving is used with forward error-correction (FEC) coding.

Figure 5:
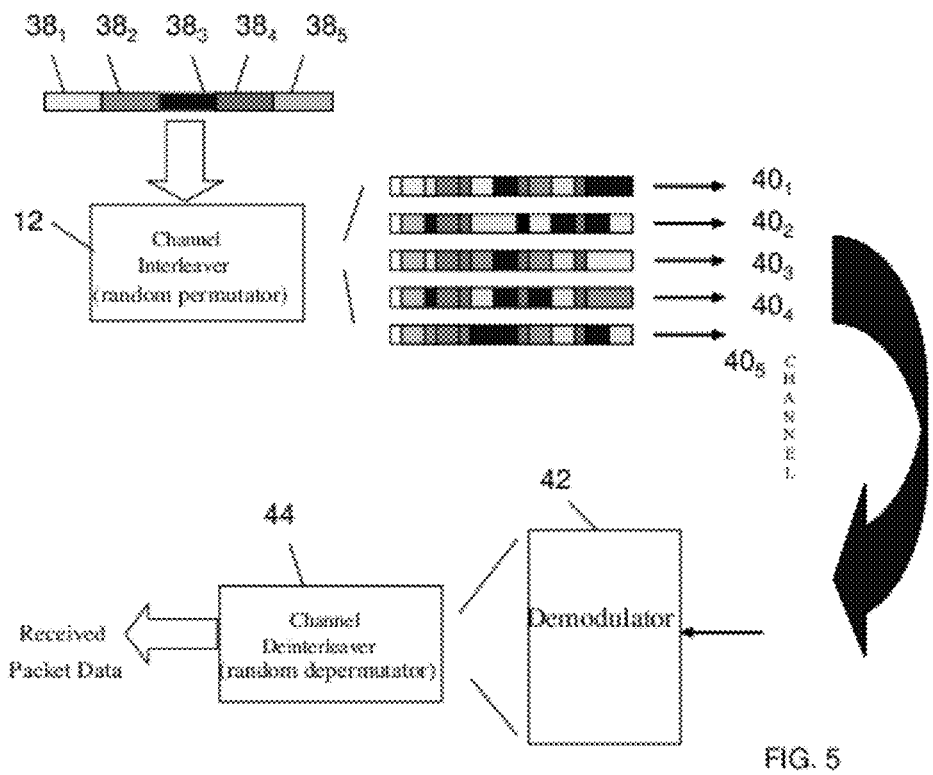
FIG. 5 illustrates an exemplary embodiment of a diversity interleaving and deinterleaving technique utilized by the present invention.

An exemplary embodiment of an interleaving diversity and deinterleaving technique utilized by the present invention is shown in FIG. 5, which shows how data bursts are interleaved to provide robustness against jamming and scintillation. The basic idea is to interleave blocks of data symbols from N encoded data bursts into N transmitted data bursts in accordance with pseudorandom mapping provided by the encrypted transmission security code. The interleaving is of the data symbols of the entire data burst and is programmable.

FIG. 5 shows an exemplary embodiment in which five different data bursts $38_1, 38_2, 38_3, 38_4, 38_5$, are interleaved by a channel interleaver 12 so that the data symbols of the five different data bursts are interleaved in five different bursts of interleaved data symbols $40_1, 40_2, 40_3, 40_4, 40_5$ for transmission at different times and/or at different frequencies when the bursts of interleaved data symbols are processed by duplication diversity. A communication signal including the N bursts of interleaved data symbols may be transmitted via a communications satellite, and/or in a communications network, such as a time division multiple access (TDMA) mesh network or a hub-spoke network.

Upon receipt of the transmitted communication signal, the transmitted bursts of interleaved data symbols are demodulated by a demodulator 42 and provided to a channel deinterleaver 44. The channel deinterleaver 44 deinterleaves the data symbols in the transmitted bursts of interleaved data symbols to recover the five different data bursts $38_1, 38_2, 38_3, 38_4, 38_5$.

There is some latency due to interleaving diversity processing but the anti-jamming protection is significant. Interleaving diversity is bandwidth efficient in that there is an N-N burst mapping. Interleaving diversity of the data symbols in the data burst structure shown in FIG. 2 is compatible with both basic multi-frequency TDMA mesh capability and hub-spoke network capability.

Figure 6:
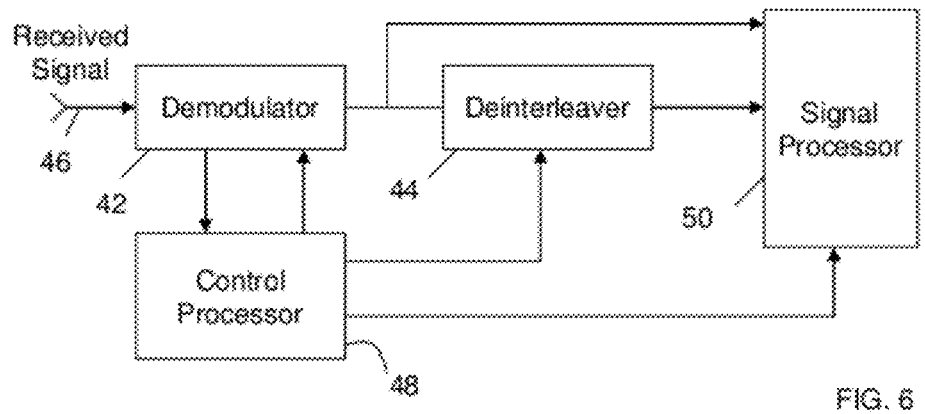
FIG. 6 is block diagram of a system for processing received signals that were processed for transmission by the system of FIG. 1.

FIG. 6 shows an exemplary embodiment of a system for processing a received communication signal 46 having a plurality of bursts 40 that individually include a plurality of data symbols, in order to recover the content of the signal 46 when the received signal is corrupted by interference during transmission of the signal 46. The system includes a demodulator 42, a deinterleaver 44, a control processor 48 and a signal processor 50.

The demodulator 42 demodulates the received signal 46 and provides the demodulated signal to both the deinterleaver 44 and the control processor 48.

The control processor 48 estimates the phase of the symbols in the data and FOW bursts of the demodulated signal by correlating peaks of the symbols in the midamble segments, finding the I/Q pairs of the midamble correlation peaks, and calculating the angles of those I/Q pairs as $\hat{\theta}_1, \hat{\theta}_2, \hat{\theta}_3, \hat{\theta}_4$. The estimated phase is the average value of these calculated angles.

The control processor 48 estimates the initial frequency of the symbols in the data and FOW bursts of the demodulated signal by correlating of a set of midamble BPSK symbols against the incoming burst. The time distance between midamble segments is $\Delta t$ seconds.

Assuming the that phase of the a-coherent combining peaks of the first midamble segment is $\theta$ and that the phase of the correlation peaks of the second midamble segment is $\hat{\theta}$, the equations for frequency estimate is:

$$\hat{F} = \frac{\hat{\theta} - \theta}{2\pi\Delta t} \text{ (Hz)} \quad \text{(Eq. 1)}$$

The variance of this estimate is equal to:

$$\sigma_F^2 = \left(\frac{1}{2\pi\Delta t}\right)^2 \frac{1}{10^{\gamma/10} \cdot N_{Sym/Midamble} \cdot M_{Ave} * N_{Ave}} \text{ (Hz}^2) \quad \text{(Eq. 2)}$$

where:

$$\Delta t = \frac{N_{Dist}}{R_{Sym}},$$

with $N_{Dist}$ being the separation in symbols between midambles. $M_{Ave}$ represents the number of pairs of midambles and $N_{ave}$ represents the amount of frequency averaging.

The maximum likelihood symbol timing error metric is given by differentiating the likelihood functional for Quadrature amplitude modulation (OAM) systems (where BPSK is a subset) corrupted by Additive white Gaussian noise (AWGN) with spectral density $N_o$, with a random phase $\phi$, and a timing offset $\tau$, when the midamble has been detected and is given by:

$$\Lambda(\phi, \tau) = \frac{1}{N_0} [a_k(\tau) \text{Re}\{e^{j\phi} m(\tau)\} + b_k(\tau) \text{Im}\{e^{j\phi} m(\tau)\}] \quad \text{(Eq. 3)}$$

Where:

$a_k$=the real part of the complex preamble symbol $a_k+jb_k$ $b_k$=the imaginary part of the complex preamble symbol $a_k+jb_k$ $-\phi$=the phase error of the burst $m(\tau)$=the matched filter output (complex)

The maximum likelihood estimate for ti is given by differentiating Equation 4.

$$\frac{\partial \Lambda}{\partial \tau} = 0 = \frac{1}{N_0} [\text{Re}\{e^{j\phi} a_k \dot{m}(\tau)\} + \text{Im}\{e^{j\phi} b_k \dot{m}(\tau)\}] \quad \text{(Eq. 4)}$$

This is equivalent to:

$$\frac{\partial \Lambda}{\partial \tau} = 0 =$$

$$\frac{1}{N_0} [\text{Re}\{e^{j\phi} a_k (\dot{m}_I(\tau) + j\dot{m}_Q(\tau))\} + \text{Im}\{e^{j\phi} b_k (\dot{m}_I(\tau) + j\dot{m}_Q(\tau))\}] \quad \text{(Eq. 5)}$$

Note that the terms involving the matched filter outputs are differentiated with respect to time. It turns out that the optimal timing filter is a derivative matched filter—in contrast to the optimal detection filter, which is the matched filter itself. The root-raised-cosine (RRC) family of Nyquist pulse shapes has a very nice property that the derivative filter M'(τ) can be approximated almost exactly by:

$$a\left[M\left(\tau+\frac{T_{sym}}{2}\right)-M\left(\tau-\frac{T_{sym}}{2}\right)\right]\cong\dot{M}(\tau) \quad \text{(Eq. 6)}$$

Where: a is a scale factor

The optimal timing filter is a derivative matched filter, in contrast to the optimal detection filter, which is the matched filter itself. The RRC family of Nyquist pulse shapes is such that the derivative filter M'(τ) can be approximated almost exactly by:

$$a\left[M\left(\tau+\frac{T_{sym}}{2}\right)-M\left(\tau-\frac{T_{sym}}{2}\right)\right]\cong\dot{M}(\tau) \quad \text{(Eq. 7)}$$

where: a is a scale factor.

Filtering of transition samples with a timing filter is accomplished by having exactly 2 samples/symbol (SPS) available at the matched filter output and by taking as the symbol timing metric y(t):

$$y(\tau)=\frac{4}{3}m(\tau)\left\{m\left(\tau+\frac{T_{sym}}{2}\right)-m\left(\tau-\frac{T_{sym}}{2}\right)\right\} \quad \text{(Eq. 8)}$$

where: m is the complex output of the matched filter taken at the various times τ shown above.

Equation 8 indicates that y(τ) is essentially zero unless a symbol transition occurs for τ−T/2 to τ+T/2. The timing metric needs to be applied to Equation 4 to compute the actual error. Equation 4 becomes a timing error when scaled by the average peak value and when phase-rotated by the negative of the phase error of the burst φ. Equation 9 is the solution to the non-data-aided problem of symbol timing estimation and is applicable in that form when the data is not known a priori, which is not the case for acquisition. In the applicable case the term inside the parentheses is known when the time offset (τ+/−Tsym/2) references a peak sample out of the matched filter and m(τ) is a "transition" sample.

The control processor 48 processes the demodulated burst to determine whether or not a data burst of the original transmitted communication signal was processed for transmission by interleaving diversity. When the control processor 48 determines that the data burst was not processed for transmission by interleaving diversity, the control processor 48 causes the demodulated data burst to be provided directly to the signal processor 50 for decoding and processing of the demodulated data burst.

When the control processor 48 determines that the data burst was processed for transmission by interleaving diversity, the control processor 48 determines whether or not the data burst may have been corrupted by interference during transmission of the communication signal. When the control processor 48 determines that a data burst of the received communication signal 46 may have been corrupted by interference, the control processor 48 inserts erasure symbols that are necessary for recovering the content of the transmitted interleaved data symbols of the corrupted burst into the deinterleaver 44 prior to such time as the deinterleaver 44 processes the corrupted burst of the received communication signal 46; and the control processor 48 causes the deinterleaved data burst to be provided to the signal processor 50 for decoding and processing of the demodulated data burst.

Figure 7:
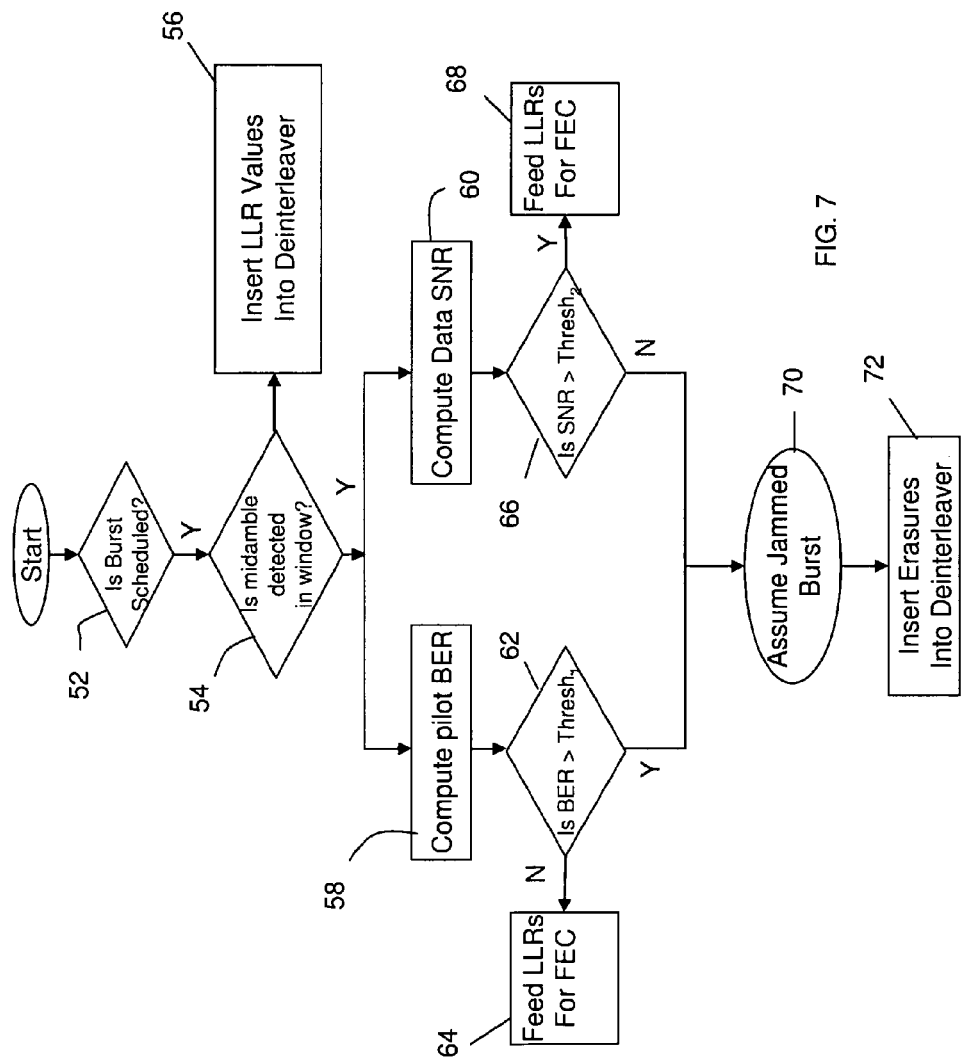
FIG. 7 is decision diagram for the control processor included in the system of FIG. 6.

A decision diagram for the control processor 48 is shown in FIG. 7. The control processor 48 begins the above-described processing routine when a data burst is scheduled, as shown at 52. During intervals when a data burst is scheduled, the control processor 48 determines whether or not data bursts are detected within time windows that individually extend both before and after the respective intervals in which the individual data burst are scheduled, as shown at 54.

When the control processor 48 determines that a data burst was not detected within the time window in which the individual data burst was scheduled, the control processor 48 causes Log Likelihood Ratio (LLR) erasure values to be inserted into the deinterleaver 44, as shown at 56.

When the control processor 48 determines that a data burst was detected within the time window in which the individual data burst was scheduled, the control processor 48 computes the bit error rate (BER) of the pilot symbols in the data burst, as shown at 58, and also computes the signal-to-noise ratio (SNR) of the data symbols in the data burst, as shown at 60.

The tracking of the pilot symbols by the control processor 48 is based upon the group of pilot symbols in each data burst being uniformly spaced after the last midamble segment, and the number of data symbols between the successive pilot symbols being known to the control processor 48. The received data burst is correlated with the known locations and spacing of the pilot symbols and the BER is determined by counting the errors resulting from said correlation.

The control processor 48 determines whether or not the BER of the pilot symbols is greater than a first predetermined threshold, as shown at 62. The control processor 48 also determines whether or not the SNR of the data symbols is greater than a second predetermined threshold, as shown at 66.

When the control processor 48 determines that the BER of the pilot symbols is not greater than the first predetermined threshold and also determines that the SNR of the data symbols is greater than the second predetermined threshold, the control processor 48 causes LLR values to be fed to the signal processor 50 for use in forward error correction (FEC) processing of the data burst provided from the deinterleaver 44, as shown at 64 and 68.

When the control processor 48 determines that the BER of the pilot symbols is greater than a first predetermined threshold or determines that the SNR of the data symbols is not greater than a second predetermined threshold, the control processor assumes that the data burst was jammed, as shown at 70; whereupon the control processor 48 causes LLR erasure values to be inserted into the deinterleaver 44, as shown at 72.

For scheduled bursts the arrival time for the received bursts is known quite precisely and a window sufficient to cover the uncertainty time is opened ahead of and past the midambles such that if the burst is not detected then the burst can be assumed to be jammed and LLR erasure values equivalent to erasures are fed into the deinterleaver 44 for the precise number of those scheduled. Otherwise, the interleaver 12 and the deinterleaver 44 will go out of synchronization and cascade thousands of symbol errors.

If the data burst is detected but the pilot symbol channel error rate is too high (about 1 -20% overhead for the 25% jamming cases) then the LLR values corresponding to erasures are fed into the deinterleaver 44.

If the SNR is too low (such as <1 dB) to decode the data; then again LLR values corresponding to erasures are fed into the deinterleaver 44.

Insertion of LLR erasure values under these circumstances significantly improves the BER of the deinterleaved data burst under strong jamming conditions. This technique typically is utilized with an interleaver depth of between 1 -80 bursts to recover the content of the data symbols of the data burst, even with some bursts conceivably being erased. The strong FEC still decodes at a slightly increased SNR and follows the benign FEC BER curve with the mechanisms employed above.

The thresholds to determine the erasure criteria are modulation and coding dependent and for a rate ½ code we are using an erasure criteria between 15-20% pilot bit errors. In an exemplary embodiment, the shortest bursts have 1914 encoded bits @ rate ½) and about 8-120 pilot symbols modulated using BPSK.

Figure 8:
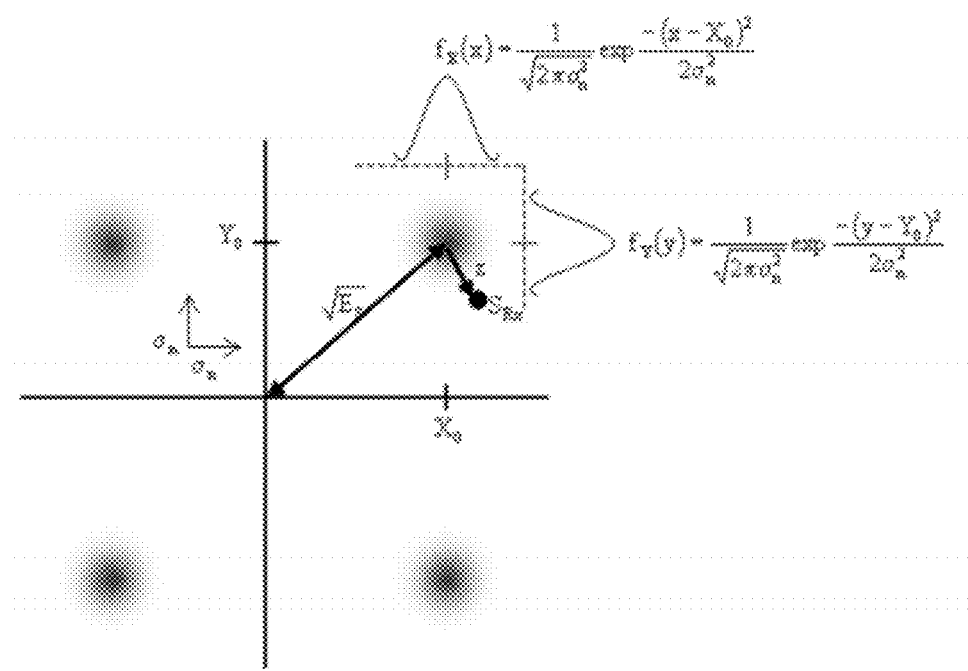
FIG. 8 illustrates the data signal-to-noise ratio computation (SNR) step shown in FIG. 7.

FIG. 8 shows the basics of how the SNR estimate is made in the modem which is used in conjunction with the BER of the tracked pilot symbols to determine whether or not a burst has been jammed. The vector z represents the Euclidean distance from the desired constellation point position and $S_{Rx}$ represents the received symbol. The average distance of z is referred to as the Error Vector Magnitude (EVM) and is related fairly accurately to the SNR of the signal. When the EVM value becomes large then the SNR is low for that symbol and if the average of a whole Turbo Code block is large, then an Es and $E_b/N_o$ estimate may be made. If this estimate is below a threshold determined by the coding rate, modulation, and constituent convolutional codes, then the burst is determined to be jammed and erasures are fed into the deinterleaver 44. This mechanism helps when the jammer is a pulse-type interferer and where the energy may not be distributed uniformly over the burst. Basically if the pilot BER is acceptable but the SNR estimate, for example, indicates an SNR of −3 dB for Quadrature Phase Shift Keying (QPSK) the burst is erased. If both are fine, the LLRs are passed to the deinterleaver 44 and the signal processor 50.

Duplication diversity offers the most rapid acquisition time since multiple copies of the FOW bust are sent under encryption control within a frame period, and the bandwidth of the FOW is small since it contains only essential information for enabling certified users to access the network.

Irrespective of the methods used to facilitate data recovery (e.g. interleaving diversity and/or duplication diversity), a critical factor in any wireless anti-jam regimen is the requirement to disperse information over time and bandwidth. To be efficient and effective, bursts must be uniformly randomized across the available time-bandwidth resource envelope and burst placement should be non-deterministic from frame-to-frame. Both criteria are accomplished by coupling the resource scheduling function with the encryption function.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A system for processing a communication signal having a plurality of bursts that individually include a plurality of data symbols in order to preserve the content of the signal when the signal is corrupted by interference during transmission of the signal, comprising:
   means for interleaving data symbols of different individual bursts of said communication signal;
   means for causing multiple transmissions of the content of said communication signal; and
   means for controlling operation of the interleaving means and the means for causing multiple transmissions in accordance with the data indicating (i) the time sensitivy of the data to be transmitted in the communication signal and (ii) the degree of vulnerability of the communication signal to interference during transmission of said signal.

2. The system according to claim 1, wherein the means for causing multiple transmissions comprise:
   means for transmitting said communication signal in a plurality of different time and frequency slots in order to make the transmission redundant.

3. The system according to claim 1, wherein the means for causing multiple transmissions comprise:
   means for transmitting said communication signal in a plurality of different time slots in one or a plurality of different frequency slots in order to make the transmission redundant.

4. The system according to claim 1, wherein the means for causing multiple transmissions comprise:
   means for causing multiple transmissions of said communication signal that has been processed by interleaving data symbols of different individual bursts of said communication signal.

5. The system according to claim 1, further comprising:
   means for determining whether a received communication signal that was processed by the interleaving means may have been corrupted by interference during transmission of the signal; and
   means for processing said received communication signal when it is determined that said received communication signal may have been corrupted by said interference, by inserting into a deinterleaver for processing said received communication signal, prior to deinterleaving of the data symbols, erasure symbols that are necessary for recovering the content of the transmitted interleaved data symbols.

6. The system according to claim 1 for transmission of the communication signal via a communications satellite.

7. The system according to claim 1 for transmission of the communication signal within a mesh network.

8. A method of processing a communication signal having a plurality of bursts that individually include a plurality of data symbols in order to preserve the content of the signal when the signal is corrupted by interference during transmission of the signal, comprising the steps of:
   (a) processing data indicating (i) the time sensitivity of the data to be transmitted in the communication signal, and (ii) the degree of vulnerability of the communication signal to interference during transmission of said signal; and
   (b) in accordance with said indications, effecting either the step of:
   (c) interleaving data symbols of different individual bursts of said communication signal; or the step of:
   (d) causing multiple transmissions of the content of said communication signal; or
   both steps (c) and (d).

9. The method according to claim 8, wherein when, step (b) consists of effecting both steps (c) and (d), step (d) includes the step of:

(e) causing multiple transmissions of a said communication signal that has been interleaved according to step (c).

10. The method according to claim 8, wherein step (d) includes the step of:
   (e) transmitting said communication signal in a plurality of different time and frequency slots in order to make the transmission redundant.

11. The method according to claim 8, wherein step (d) includes the step of:
   (e) transmitting said communication signal in a plurality of different time slots in one or a plurality of different frequency slots in order to make the transmission redundant.

12. The method according to claim 8, wherein step (d) includes the step of
   (e) causing multiple transmissions of said communication signal that has been processed according to step (a).

13. The method according to claim 8, further comprising the steps of:
   (e) determining whether a received communication signal that was processed according to steps (c) and (d) may have been corrupted by interference during transmission of the signal; and
   (f) when it is determined that said received communication signal may have been corrupted by said interference, prior to deinterleaving of the data symbols, inserting into a deinterleaver for processing said received communication signal, erasure symbols that are necessary for recovering the content of the transmitted interleaved data symbols.

14. The method according to claim 8 for transmission of the communication signal via a communications satellite.

15. The method according to claim 8 for transmission of the communication signal within a mesh network.

16. A nontransitory computer readable storage medium for use with a computer in a system for processing a communication signal having a plurality of bursts that individually include a plurality of data symbols in order to preserve the content of the signal when the signal is corrupted by interference during transmission of the signal, wherein the system comprises: means for interleaving data symbols of different individual bursts of said communication signal; means for causing multiple transmissions of the content of said communication signal; and means for controlling operation of the interleaving means and the means for causing multiple transmissions in accordance with data indicating (i) the time sensitivity of the data to be transmitted in the communication signal and (ii) the degree of vulnerability of the communication signal to interference during transmission of said signal,
   wherein the computer readable storage medium contains computer executable program instructions for causing the computer to process the time-sensitivity data and the degree-of-vulnerability data to control said operation of the interleaving means and the means for causing said multiple transmissions.

17. The nontransitory computer readable storage medium according to claim 16, wherein the program instructions include instructions for (a) causing said interleaving of said data symbols; (b) causing said multiple transmissions of said communication signal; and/or (c) causing said interleaving of said data symbols and causing said multiple transmissions of a said communication signal having interleaved data symbols.

* * * * *

UNITED STATES PATENT AND TRADEMARK OFFICE
CERTIFICATE OF CORRECTION

PATENT NO. : 8,175,186 B1
APPLICATION NO. : 12/274636
DATED : May 8, 2012
INVENTOR(S) : John Robert Wiss et al.

It is certified that error appears in the above-identified patent and that said Letters Patent is hereby corrected as shown below:

Column 6, line 26, "(OAM)" should be --(QAM)--
Column 6, line 44, "ti" should be --τ--
Column 8, line 58, "1 -20%" should be --10-20%--
Column 8, line 67, "1 -80" should be --10-80--
Column 9, line 10, "8-120" should be --80-120--

Signed and Sealed this
Twenty-fifth Day of September, 2012

David J. Kappos
*Director of the United States Patent and Trademark Office*